United States Patent [19]

Norton

[11] 4,172,607
[45] Oct. 30, 1979

[54] PIPE COUPLING WITH PLASTIC SHEATH

[76] Inventor: Bernard W. Norton, 776 Augusta Dr., Moraga, Calif. 94556

[21] Appl. No.: 871,386

[22] Filed: Jan. 23, 1978

[51] Int. Cl.² ............................................ F16L 21/00
[52] U.S. Cl. .................................... 285/236; 285/373; 285/383
[58] Field of Search ............... 285/236, 293, 373, 369, 285/383, 253, DIG. 16

[56] References Cited

U.S. PATENT DOCUMENTS

| 1,823,974 | 9/1931 | Ferguson | 285/243 |
| 1,928,316 | 9/1933 | Muto | 285/373 |
| 2,980,143 | 4/1961 | Harris | 285/383 X |
| 3,233,922 | 2/1966 | Evans | 285/236 |
| 3,359,017 | 12/1967 | Schaub | 285/236 |
| 3,394,952 | 7/1968 | Garrett | 285/236 |
| 3,529,854 | 9/1970 | Thomas | 285/369 X |
| 3,813,116 | 5/1974 | Horsley | 285/236 |
| 3,837,683 | 9/1974 | Taylor | 285/236 |

FOREIGN PATENT DOCUMENTS

| 935465 | 10/1973 | Canada | 285/236 |
| 1176593 | 8/1964 | Fed. Rep. of Germany | 285/48 |

Primary Examiner—Dave W. Arola
Attorney, Agent, or Firm—Owen, Wickersham & Erickson

[57] ABSTRACT

A pipe coupling is disclosed, of the type comprising an annular elastic gasket fitted over the two adjacent pipe ends and tightened down with encircling clamp bands. The coupling includes a plastic band surrounding the elastic gasket, with overlapping ends tapered in thickness. The metal clamp bands encircle the plastic band and are retained in place by ridges forming channels on the outside surface of the plastic band.

2 Claims, 5 Drawing Figures

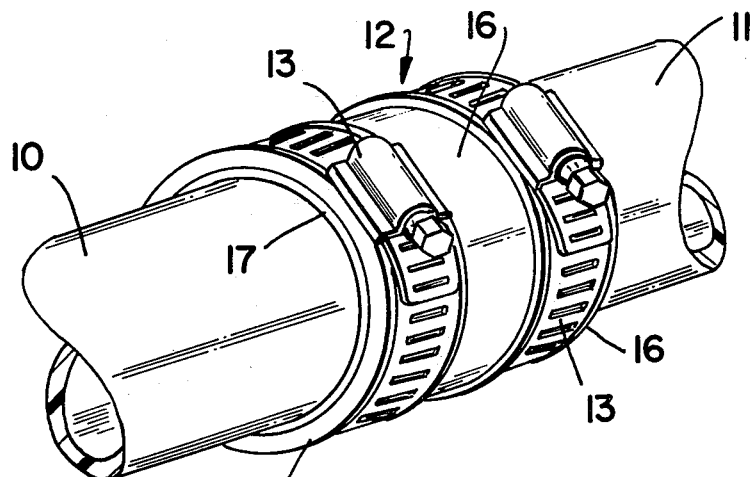
FIG_1
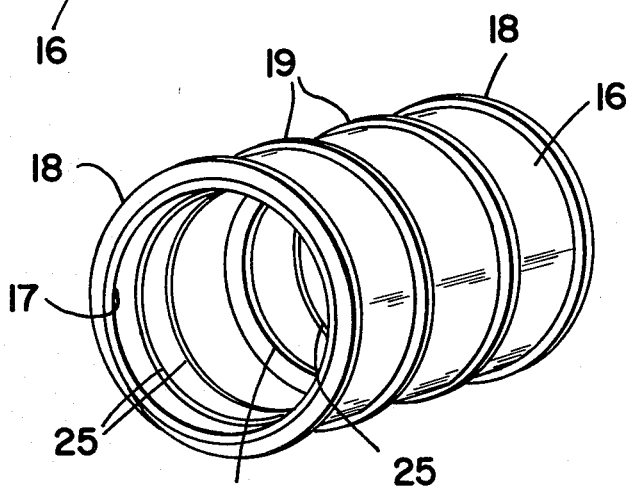
FIG_2
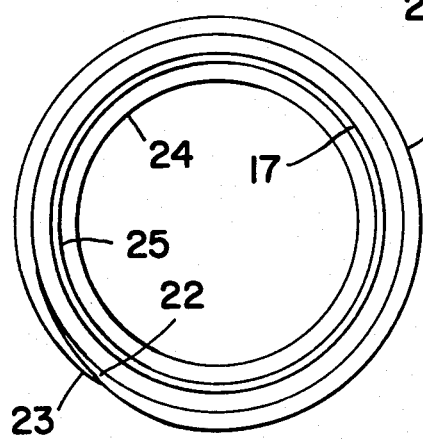
FIG_3
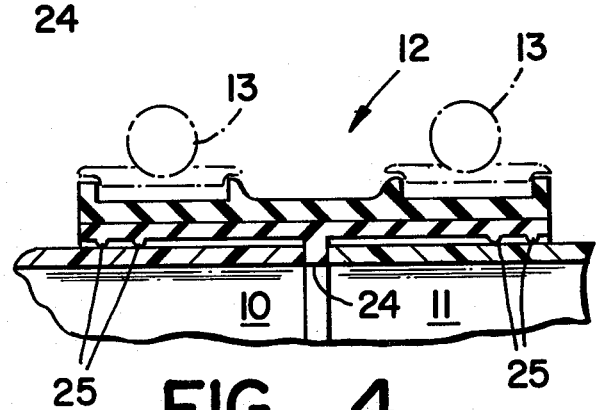
FIG_4
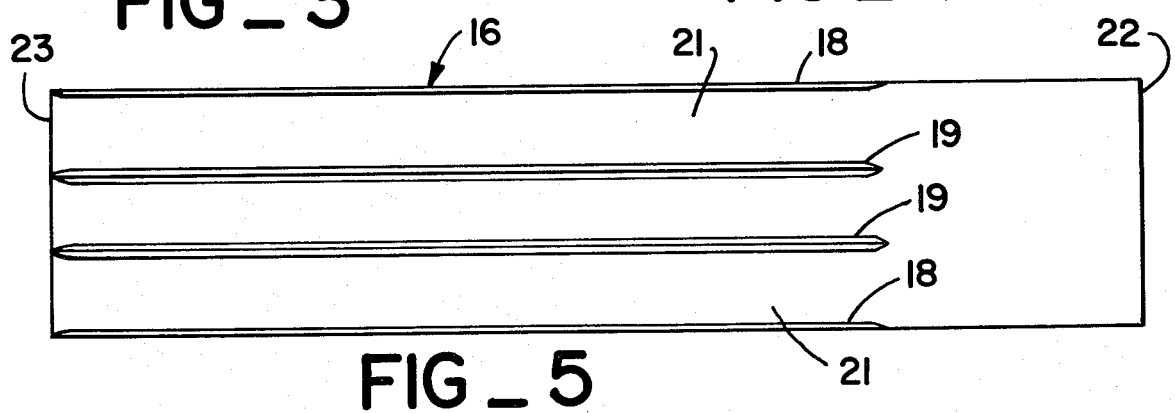
FIG_5

PIPE COUPLING WITH PLASTIC SHEATH

BACKGROUND OF THE INVENTION

The invention relates to pipe couplings, and more particularly to the type coupling often used for cast iron soil pipe, wherein an annular elastic gasket is fitted over adjacent pipe ends and tightened down with encircling bands.

A number of clamped band type soil pipe couplings have been suggested and used previously. The typical such coupling utilized a corrugated sheet metal shield with overlapped ends, the shield being immediately circumjacent the elastic gasket band. Surrounding the shield were at least two axially spaced metal clamp bands capable of being tightened down by a wrench or screw driver. The clamp bands were typically tack-welded to the corrugated shield at several locations to retain them in place, both the bands and the shield usually being of stainless steel to resist the corrosive influences associated with soil pipe. Couplings of this type are shown in U.S. Pat. Nos. 3,233,922 and 3,359,017.

Although these couplings have in general been effective, they are relatively costly to produce, particularly in light of the large amount of stainless steel required for the corrugated shield and also because of the required tack-welding operations. Also, the overlapped corrugations of the shield ends sometimes caused an undesirable frictional resistance to tightening, since the corrugations of the two ends were being tightly pressed together during tightening.

No previous coupling of this type has been as efficient in operation and as economically manufactured and easily assembled as the present invention described below.

SUMMARY OF THE INVENTION

The present invention is an improved pipe coupling having several advantages over previous couplings as described above. The coupling of the invention uses an elastic gasket band to fit over the pipe ends, as in previous couplings, but surrounding the band is a plastic member with overlapped ends, smooth on all surfaces contacting the gasket and at overlapping surfaces, to avoid undesirable friction resistance during tightening. Pairs of ridges run around the exposed outersurface of the plastic member to form annular channels which guide axially spaced metal clamp bands such as have been used previously. There are no potentially interfering edges, ridges, etc. between the clamp bands and the plastic member against which they bear.

The plastic member is easily produced in flat, linear configuration and is of course more economically produced than a stainless steel corrugated shield. In addition, no tack welding or other type adhering operation is required for assembly. The clamp bands are simply placed over the plastic member as it is held rolled over the elastic gasket band, and the ridge-formed channels hold the bands in place.

It is therefore among the objects of the invention to provide an improved pipe coupling which is more economically produced and more effective and efficient in use than previous clamp type pipe couplings. This and other objects, advantages and features of the invention will be apparent from the following description of a preferred embodiment, taken in conjunction with the accompanying drawings.

DESCRIPTION OF THE DRAWINGS

FIG. 1 is a perspective view showing two sections of pipe joined together by a coupling according to the invention.

FIG. 2 is a perspective view showing the coupling with a pair of clamping bands removed.

FIG. 3 is an end view of the coupling shown in FIG. 2, with clamping bands removed.

FIG. 4 is a sectional view of a portion of the coupling as shown in FIG. 1, connecting the two pipe sections.

FIG. 5 is a view of a plastic member which forms a portion of the coupling, shown in the flat as it is produced.

DESCRIPTION OF A PREFERRED EMBODIMENT

In the drawings, FIG. 1 shows a pair of pipe sections 10 and 11, joined together by a coupling 12 according to the invention. The pipes 10 and 11 typically are cast iron soil pipe.

The coupling 12 is tightened down onto the pipe sections by clamping bands 13, preferably of the screw type often used as hose clamps. These bands encircle and clampingly engage a plastic sheath member 16, which in turn engages an annular resilient gasket member 17 tightly and sealingly against the pipes 10 and 11.

FIG. 5 shows the plastic sheath member 16 in flat, developed position, as it is manufactured. The sheath 16 includes ridges 18 and 19 which protrude upwardly along its edges and at inner locations, respectively. The adjacent pairs of ridges form axially spaced channels 21 U-shaped in cross-section for retention and guidance of the clamping bands 13, as indicated in FIGS. 1 and 4.

At least two channels and clamping bands are provided; two or more may be provided at each side of the coupling, for each pipe, if desired for additional gripping of the pipes.

As FIG. 5 indicates, the ridges 18 and 19 terminate somewhat short of an end 22 of the sheath which is overlapped by the other end 23. Thus, the ridges do not interfere with the tightening operation.

FIGS. 2 and 3 show the plastic sheath rolled over the resilient gasket member, with the outer end 23 overlapped over end 22. As indicated, both ends are tapered in thickness at their overlapped portions, to a thin edge, so that pressure can be applied around the circumference of the gasket member 17 by the clamping bands as evenly as possible. Excessively thick areas would cause objectionably uneven pressure to be applied. The thinness of the edge at the end 22 also allows that end to advance between the above portion of the sheath and the resilient gasket 17 during tightening without catching on the gasket.

As FIG. 4 illustrates, the resilient annular gasket 17 is of the typical configuration, with a central annular flange 24 dividing and providing a stop for the two pipe sections 10 and 11, and several annular ridges 25 positioned under each clamping band 13 for compression and sealing engagement against the pipe.

The above described preferred embodiment provides a pipe coupling which is significantly more economical to produce than previous couplings, and which avoids potentially troublesome friction areas characteristic of previous overlapping corrugated stainless sheaths. Various other embodiments and variations of this preferred embodiment will be apparent to those skilled in the art and may be made without departing from the spirit and scope of the following claims.

I claim:

1. A pipe coupling of the type including a resilient annular gasket fitted over and compressed by clamping means against the outer surfaces of the two pipes to be joined, comprising:

a flexible plastic sheath having two ends, wrapped around and engaging the resilient annular gasket with the ends overlapping, said sheath being approximately the width of the resilient gasket;

a plurality of ridges on the outside surface of the flexible plastic sheath forming at least two annular channels U-shaped in cross-section, one positioned circumjacent each pipe, said plurality of ridges extending substantially from points spaced from one end of the sheath to the outer overlapping other end of the sheath through the exposed circumference of the sheath; and at least two clamping bands positioned around the flexible plastic sheath, one in each annular channel, and provided with means for clamping and tightening said bands about said gasket to seal it against said pipes and retained in place therein by the ridges.

2. The pipe coupling of claim 1 wherein each end of the plastic sheath is tapered in the overlapped area to a thin end edge, so that substantially even pressure is exerted on the resilient gasket member and on the pipes.

* * * * *